Feb. 10, 1953     O. E. TEALL     2,627,922
MACHINE FOR CUTTING TISSUE
Filed Feb. 14, 1950     4 Sheets-Sheet 1
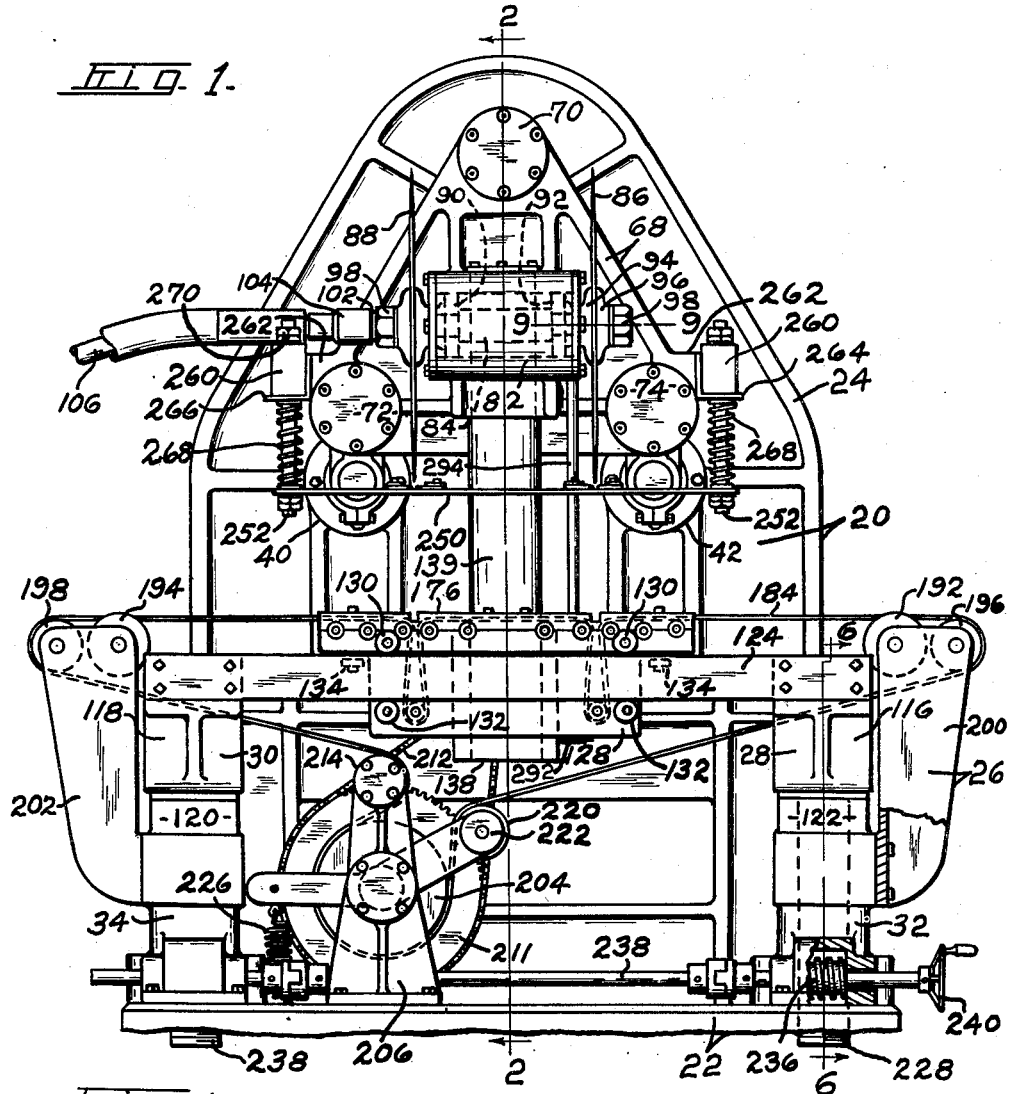
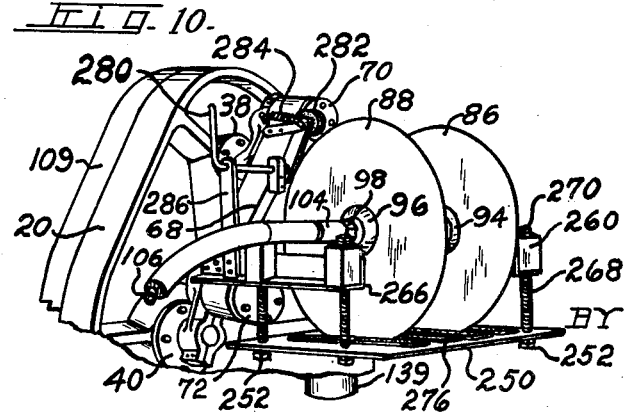
INVENTOR
OLIVER E. TEALL
BY
ATTORNEY

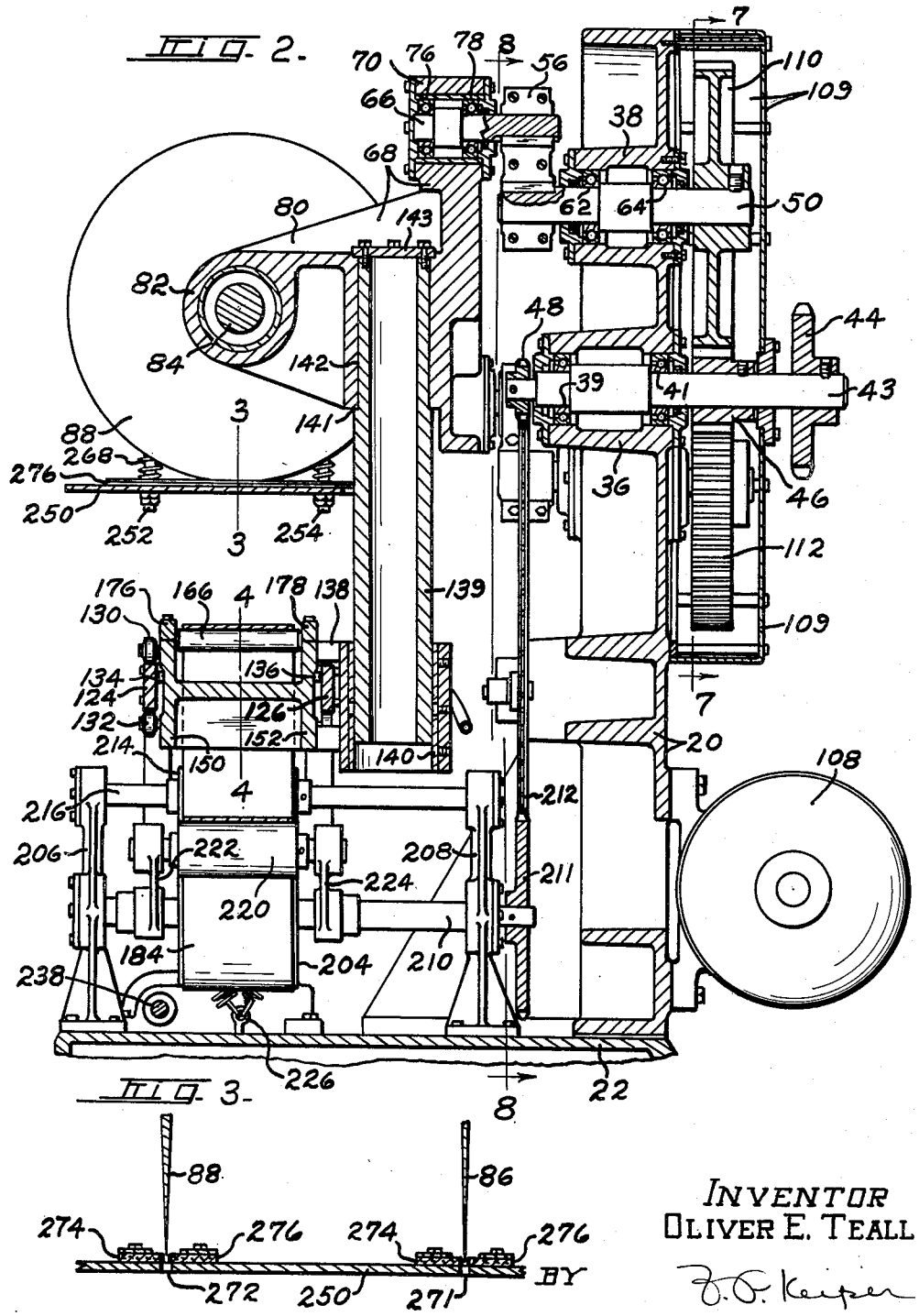

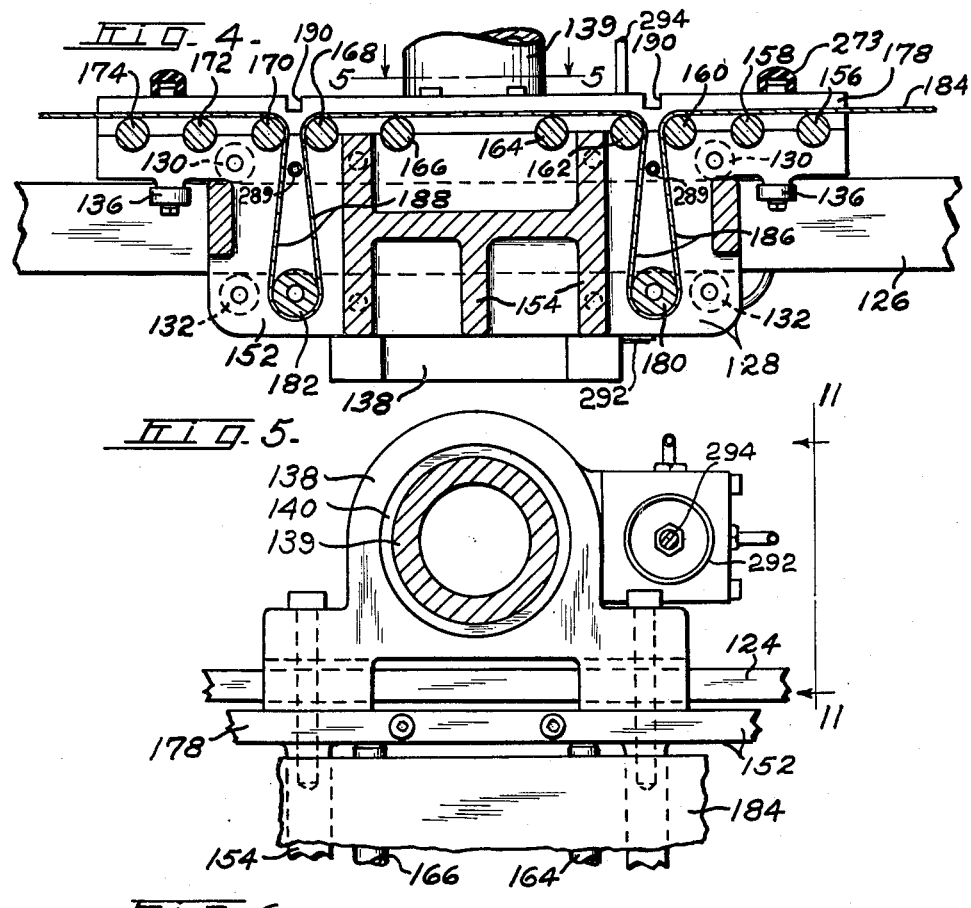

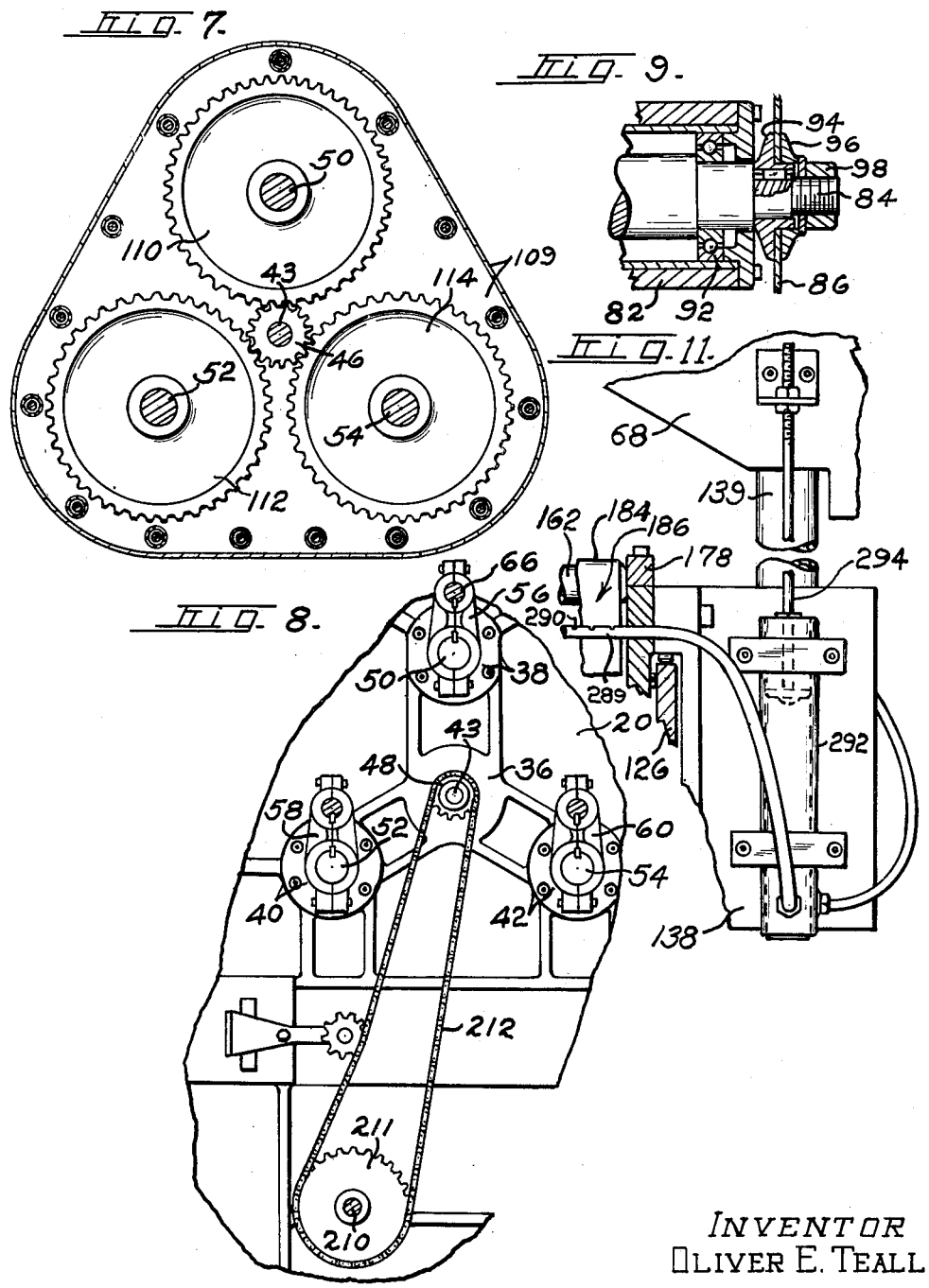

Patented Feb. 10, 1953

2,627,922

UNITED STATES PATENT OFFICE 2,627,922

MACHINE FOR CUTTING TISSUE

Oliver E. Teall, Phoenix, N. Y., assignor of one-third to William Edds, Seneca Falls, and one-third to Douglas Crutchley, Cicero, N. Y.

Application February 14, 1950, Serial No. 144,094

11 Claims. (Cl. 164—61)

1

This invention relates to cutting machines, and more particularly to a cutting machine adapted to cut predetermined lengths from a continuously moving multiple-layer stack of folded tissue, cellulosic fibrous material, such as paper toweling or the like.

The invention has to do with the provision of a conveyor adapted to continuously feed material and cooperating with one or more cutters having a movement substantially corresponding to that of the conveyor feed during the cutting operation, whereby the material may be fed through the machine with uniform speed. More particularly, the invention has to do with one or more circular cutters mounted upon cranks for rotary movement and adapted to cooperate with a belt feed to rapidly convey material in strip form in cutting relation to the circular cutters, the material passing substantially tangentially, or chordally through the rotary path of movement of the circular cutting knife edges. Further, the invention has to do with momentary clamping and traveling mechanism cooperating with the conveyor belt to secure the traveling material during the cutting period without affecting the continuous movement of the material.

The above and other features of the invention, including the coordinating mechanism for synchronizing the operation of the parts, will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a front elevation of a cutting machine employing two circular cutters;

Figure 2 is a transverse section taken substantially on the line 2—2 of Figure 1;

Figure 3 is a fragmentary section taken on the line 3—3 of Figure 2, showing the circular cutting knives;

Figure 4 is a section taken on the line 4—4 of Figure 2, and showing the conveyor and coordinating traverse table;

Figure 5 is a section taken on the line 5—5 of Figure 4, and showing the sliding rod for imparting motion to the table;

Figure 6 is a fragmentary section taken on the line 6—6 of Figure 1, showing one of the elevators for the conveyor;

2

Figure 7 is a section taken on the line 7—7 of Figure 2, showing the multiple gear drive for the circularly moving cutters;

Figure 8 is a fragmentary detail taken substantially on the line 8—8 of Figure 2, showing the coordinating drive means for the conveyor;

Figure 9 is a fragmentary section taken on the line 9—9 of Figure 1;

Figure 10 is a fragmentary perspective of the cutter support with a grinding device applied thereto; and Figure 11 is a fragmentary section taken on the line 11—11 of Figure 5.

Referring to Figure 1, there is shown a main frame 20 comprising a base 22 and a rear upstanding support 24. Mounted on the base is a conveyor assembly frame 26 having end supports 28 and 30 carried on base mounted upstanding tubular posts or columns 32 and 34. The rear support 24 is provided with a main bearing boss 36, and triangularly disposed crank bearing bosses 38, 40 and 42.

Journaled on bearings 39 and 41 in the boss 36 is a main drive shaft 43 having a power driven sprocket 44 and a drive pinion 46 at the rear thereof, and a conveyor drive sprocket 48 at the forward end thereof, all keyed to the shaft 43. Any source of power may be employed, it being desirable to provide a variable speed device, so that the speed of the machine may be closely regulated, for reasons to appear hereinafter.

Journaled in each of the bosses 38, 40 and 42 are shafts 50, 52 and 54, each having cranks 56, 58 and 60, typical shaft 50 having spaced bearings 62 and 64, and crank 56 having a crank pin 66. A triangular frame and bracket member 68 having triangularly disposed journal boxes 70, 72 and 74 are adapted to receive the crank pins of the respective shafts 50, 52 and 54, in suitable bearings such as indicated at 76 and 78.

The bracket portion 80 of the member 68 is provided with a journal box 82 disposed above the conveyor assembly in which is mounted a double-ended spindle 84 having high speed circular cutters or knives 86 and 88. The spindle is mounted in bearings 90 and 92 and opposite ends of the spindle are shouldered and adapted to receive circular blade clamping members 94 and 96 held in position by threaded fastening means 98. One end of the spindle is projected as at 102 and provided with a coupling 104 to a flexible shafting 106, which in turn may be driven by any suitable source of power, such as a motor 108.

In order to simplify the gear drive shown in Figure 7, wherein the drive pinion 46 is shown in mesh with similar driven gears 110, 112 and 114 keyed to the respective crank shafts 50, 52 and 54, the journals 38, 40 and 42, as well as the bracket frame journals, are disposed in similar equilateral triangular relation, and the cranks bear similar phase relation to one another, so that the bracket frame supporting the circular cutter knives moves in a circular motion. Any suitable housing such as 109 may be provided to protect the gears.

The conveyor assembly comprises U members 116 and 118 affixed to tubular columns 120 and 122 which may be slidably raised or lowered in the upstanding base columns 32 and 34, as will be hereinafter referred to. The U members 116 and 118 support spaced parallel rails 124 and 126 upon which is mounted a conveyor belt traverse table 128. Such table is provided with top and bottom rollers 130 and 132 engaging the respective top and bottom faces of rails 124 and 126 and lateral rollers 134 and 136 engaging the respective inner faces of the rails 124 and 126. The table is provided with a rearwardly extending bracket 138, having a sleeve 140 slidingly receiving a tubular column member 139 depending from and rigidly secured as by a shoulder 141 and flange plate 143 in an aperture 142 in the bracket portion 80 of the frame 68. It will thus be seen that as the bracket frame moves bodily in its circular path, the column 139 moves the traverse table upon the rails 124 and 126.

The traverse table comprises spaced side members 150 and 152 joined by webbing 154, between which are journaled rollers 156, 158, 160, 162, 164, 166, 168, 170, 172 and 174, the same being suitably held in place between the side members 150 and 152 and respective cleats 176 and 178. A pair of rollers 180 and 182 are also mounted in the lower part of the table between the side members 150 and 152. It will be seen that the conveyor belt 184 is supported by the rollers 156—174, inclusive, and is provided with bights 186 and 188 between rollers 160 and 162, and rollers 168 and 170, the belt being made to traverse the lower rollers 180 and 182. The bights are so spaced with relation to the circular knives 86 and 88 as to permit the knives to cut to a level slightly below that of the belt as supported on the table, and the cleats 176 and 178 are suitably notched as at 190 to clear the cutting edge of the knives.

The conveyor belt travels over flanged rollers 192 and 194, and end rolls 196 and 198 supported in brackets 200 and 202 extending from the base supported columns 32 and 34, respectively. Drive means for the conveyor belt comprises the drum 204 mounted in bearing brackets 206 and 208, such drum being keyed to a shaft 210, projecting through the bracket 208 and having a sprocket 211, chain driven as at 212 from the drive shaft sprocket 48.

A roller 214 mounted on shaft 216 carried by brackets 206 and 208 serves to guide the conveyor belt to the drive roll, and an idler pulley 220, mounted on pivoted brackets 222 and 224, spring tensioned as at 226, serves to properly tension the belt.

Since the diameter of the cutter blades may vary with repeated grinding, it is desirable to elevate the traverse table from time to time to compensate for the gradual change in cutter diameter. For this purpose, the column members 120 and 122, supporting the rails 124 and 126, are each provided with screw jack threads 228 and a threaded thrust member 230 bearing against a base thrust collar 232. Each of the threaded members 230 are provided with a toothed worm wheel 234, meshing with spaced worms, as at 236, mounted at either end of the shaft 238. The shaft is suitably journaled in the base supported columns 32 and 34, and is provided at one end with a hand wheel 240. From the foregoing, it will appear that the rails 124 and 126 and table 128 may be raised or lowered effecting but a slight variation in the otherwise normal level stretch of the belt between end rollers 196 and 198.

Since the apparatus thus described is adapted to cut a multiple layer stack of tissue or other delicate cellulosic material of considerable thickness, it is desirable to provide holding means for the material while being cut. For this purpose, there is provided a plate 250 supported upon four quadrilaterally disposed front and rear bolts 252, 254, and the same being slidably received in quadrilaterally disposed front and rear bosses 260, carried on suitable angle iron members such as 264 and 266, extending forwardly from and secured to the rear frame 68 on mounts 262. Coil springs 268 threaded upon each of the four bolts 252 and 254 may be preloaded to any desired degree by adjusting the nuts 270. Such plate is so located with respect to the bracket that upon the bracket approaching the lower portion of its circular motion, it will engage the stack of material carried by the conveyor belt, and further motion will cause the springs 268 to yield, the knives thereupon projecting through the slots 271 and 272, the knives projecting slightly into the bights 186 and 188 at the lowermost point of the circular motion described. Suitable rubber bumpers 273 may be provided to engage the plate should the machine be operated after failure of material supply. In order to prevent the circular cutters from creating air currents tending to displace severed material, particularly after the plate 250 is elevated from its holding relation with respect to the material, felt strips 274 and 276 are provided adjacent the slots 271 and 272 to substantially close such slots, whether the cutters are above or projecting therethrough.

The multiple layer tissue as it passes over the bights 186 and 188, may tend, particularly the lower layers as soon as severed, to follow the belt into the bights. In order to forestall such action, an air tube 289 with upwardly directed jets 290 may be positioned transversely within each bight, and compressed air delivered to such jets during and immediately following the cutting operation. A convenient method of providing compressed air upon each cutting stroke comprises a cylinder 292 and piston 294 secured to the traverse bracket 138, and rotating bracket 68, respectively, with suitable connection from the cylinder to said jets. Then upon each downward movement of the blades, air is compressed and caused to subsequently discharge through said jets. The flow through said jets lags slightly behind the compression stroke since it is necessary to air buoy or support the cut web stock end for a brief moment after the cutter passes lower dead center. Any tendency of the stock to adhere to the belt, as by electrostatic action or the like, is thus eliminated.

An abrasive wheel 282 may be provided for renewing the cutting edge of the cutter 88 from time to time. Such wheel is mounted on a rock shaft 280 carried on a bracket 286, for ready manipulation to bring the abrasive wheel into engagement with the cutter against the urge of spring 284. While a single such abrasive wheel has been shown in Figure 10 in conjunction with cutter 88, a similar wheel and rock shaft may be mounted on the other side for cutter 86, as will readily be understood by those skilled in the art.

The operation of the machine will appear from the foregoing description. However, it is desirable to indicate briefly the over-all coordination between the moving parts. For example, the belt moves continuously at such constant speed as it is desired to feed a continuous strip of material to the machine for cutting. The knives being adapted to cut two sections on each revolution of the cranks 56, 58 and 60, will necessarily rotate once for a belt travel equal to double the axial spacing between the blades, approximately. Further, the tangential velocity of the cranks will be essentially that of the speed of the belt travel, and the crank arm radius will bear a relation to belt movement per crank revolution, equal to the crank radius divided by the circumference of the crank pin circle. Further, it will appear that the traverse table moves to and fro in simple harmonic motion, and that at times such as when the cutters are at their low point, such table moves at belt speed, and that momentarily there is no relative movement between table and belt. While the material being cut moves substantially tangential with the circular movement of the cutters, the relationship is somewhat chordal, but any slight variation in relative velocities is absorbed by slight yielding compressibility or buckling of the material being fed through the machine and undergoing cutting.

From the foregoing, it will readily appear that multiple cutters greater than two in number may be employed, it being necessary to rearrange the blade spacing proportionately to cut uniform lengths, the spacing as shown being substantially 3.1416 times the crank radius.

From the foregoing, it will be apparent that a machine has been provided capable of rapidly cutting a continuous multilayer stack of multiple facial or other tissue, toweling, or other cellulosic or similar material into sections, adaptable for placing in cartons ready for marketing without interfering in any manner with the continuously moving stream fed into the machine. It will also be apparent that the speed of the machine may be readily varied to accommodate the varying rates of feed without altering the cut lengths produced thereby, since the conveyor and circular movement of the cutters is coordinated at all times. The machine may operate continuously, since the cutter blades may be sharpened, and the table height can be adjusted to compensate without any stoppage whatsoever.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a cutting machine for cellulosic material and the like, a frame, a conveyor belt, a pair of axially spaced circular knives for transversely cutting material carried upon said belt, means for mounting said knives for substantially circular movement through a path with the edges of both knives intersecting said belt through an arc of said path, said knives being spaced one-half the circumference of said path, means for coordinating the movement of said belt with the peripheral velocity of said circular movement to move said belt a distance twice the spacing of said knives for each complete circular movement, and means providing movable bights in said belt in the planes of said knives when traversing said arc to receive the cutting edges of said knives.

2. In a cutting machine for cellulosic material and the like, a frame, a conveyor belt, a plurality of axially spaced circular knives for transversely cutting material carried upon said belt, means for mounting said knives for substantially circular movement through a path with the edges of said knives intersecting said belt through an arc of such path, said knives being spaced by a fraction of the circumference of said path equal to one divided by the number of knives, means for coordinating the movement of said belt with the peripheral velocity of said circular movement to move said belt a distance equal to the length of the path of circular movement of the knives for each complete circular movement, and means providing a plurality of movable bights in said belt to receive the cutting edges of said blades, and means for coordinating the movement of said last-named means with the circular movement of said knives to retain said bights in the plane of said knives when traversing said arc.

3. In a cutting machine for cellulosic material and the like, a frame, a conveyor belt, movable means effecting a plurality of bights in said belt, axially spaced circular knives including means for moving said knives circularly through a path tangential to said belt with said knives intersecting the path of said belt during a lower arc of such circular movement, said knives being spaced by a fraction of the circumference of said path equal to one divided by the number of knives, and means coordinating the movement of said bights with the longitudinal movement of said knives so as to lie in the planes thereof, when in intersecting relation to the path of said belt, means for moving said conveyor belt at substantially the tangential velocity of said circular movement of said knives and a distance equal to the length of said path for each complete circular movement of said knives, and means carried by said moving means for engaging and resiliently compressing work material carried on said belt during cutting.

4. In a cutting machine for cellulosic material and the like, a frame, a conveyor belt, movable means effecting a bight in said belt, a circular knife including means for moving said knife circularly through a path tangential to the longitudinal axis of said belt with said knife intersecting the path of said belt, and means coordinating the movement of said bight with the movement of said knife so as to lie in the plane thereof, when in intersecting relation to the path of said belt, means for moving said conveyor belt at substantially the tangential velocity of said circular movement of said knife, and means including an upwardly directed jet within the bight for air buoying the cut end of material across said bight.

5. In a cutting machine for multiple layer tissue and the like, comprising a frame having a base and back support, a conveyor belt mounted on said base and having a horizontal section arranged forward of said back support, means for moving said belt at a uniform speed, a track extending along said section, traverse means riding on said track having means to support and to effect a bight in said belt, a plurality of power driven cranks journaled in said back support, having a circular path of movement, a cutter bracket carried by said cranks and rotatable in a plane longitudinally and perpendicularly of said belt, a circular cutter journaled in said bracket on an axis parallel with said section, said circular cutter having a diameter such as to intersect the path of said belt section, when swinging through a lowermost arc of its circular movement, means for moving said traverse means to and fro upon said track with said bight retained in the plane of said circular cutter, means carried by said bracket and movable therewith comprising a horizontally disposed pressure plate yieldingly supported upon said bracket and having a slot through which the lower portion of said circular cutter may project, and yielding closure means for said slot adapted to embrace the opposite faces of said cutter, said pressure plate being adapted to approach said belt and resiliently clamp material traveling on said belt while said cutter traverses said arc, and means coordinating the movement of said belt with the peripheral velocity of said cranks and means to adjust the height of said track.

6. In a cutting machine for multiple layer tissue and the like, comprising a frame having a base and back support, a conveyor belt mounted on said base and having a horizontal section arranged forward of said back support, means for moving said belt at a uniform speed, a track extending along said section, traverse means riding on said track having means to support and to effect a pair of bights in said belt spaced along the length thereof, a plurality of power driven cranks journaled in said back support, having a circular path of movement approximately double the spacing between said bights, a cutter bracket carried by said cranks and rotatable in a plane longitudinally and perpendicularly of said belt, a pair of circular cutters journaled in said bracket on an axis parallel with said section, and axially spaced one-half the length of said circular path and to correspond to the space between said bights, said circular cutters having a diameter such as to intersect the path of said belt section, when swinging through a lowermost arc of their circular movement, means for moving said traverse means to and fro upon said track with said bights retained in the planes of said circular cutter, means carried by said bracket and movable therewith comprising a horizontally disposed pressure plate yieldingly supported upon said bracket, said pressure plate being adapted to approach said belt and resiliently clamp material traveling on said belt while said cutters traverse said arc, and means coordinated with the movement of said cutters for moving said belt twice the distance between said cutters for each revolution of said cranks.

7. In a cutting machine for multiple layer tissue and the like, comprising a frame having a base and back support, a conveyor belt mounted on said base and having a horizontal section arranged forward of said back support, means for moving said belt at a uniform speed, a track extending along said section, traverse means riding on said track having means to support and to effect a pair of bights in said belt spaced along the length thereof, a plurality of power driven cranks journaled in said back support, having a circular path of movement approximately double the spacing between said bights, a cutter bracket carried by said cranks and rotatable in a plane longitudinally and perpendicularly of said belt, a pair of circular cutters journaled in said bracket on an axis parallel with said section, and axially spaced one-half the length of said circular path and to correspond to the space between said bights, said circular cutters having a diameter such as to intersect the path of said belt section, when swinging through a lowermost arc of their circular movement, means for moving said traverse means to and fro upon said track with said bights retained in the planes of said circular cutters, means carried by said bracket and movable therewith comprising a horizontally disposed pressure plate yieldingly supported upon said bracket and having slots through which the lower portion of said circular cutters may project, said pressure plate being adapted to approach said belt and resiliently clamp material traveling on said belt while said cutters traverse said arc, and means coordinated with the movement of said cutters for moving said belt twice the distance between said cutters for each revolution of said cranks.

8. In a cutting machine for multiple layer tissue and the like, comprising a frame having a base and back support, a conveyor belt mounted on said base and having a horizontal section arranged forward of said back support, means for moving said belt at a uniform speed, a track extending along said section, traverse means riding on said track having means to support and to effect a pair of bights in said belt spaced along the length thereof, a plurality of power driven cranks journaled in said back support, having a circular path of movement approximately double the spacing between said bights, a cutter bracket carried by said cranks and rotatable in a plane longitudinally and perpendicularly of said belt, a pair of circular cutters journaled in said bracket on an axis parallel with said section, and axially spaced to correspond to the space between said bights, said circular cutters having a diameter such as to intersect the path of said belt section, when swinging through a lowermost arc of their circular movement, means for moving said traverse means to and fro upon said track with said bights retained in the planes of said circular cutters, means carried by said bracket and movable therewith comprising a horizontally disposed pressure plate yieldingly supported upon said bracket and having slots through which the lower portion of said circular cutters may project, and yielding closure means for said slots adapted to embrace the opposite faces of said cutters, said pressure plate being adapted to approach said belt and resiliently clamp material traveling on said belt while said cutters traverse said arc, means coordinating the movement of said belt with the peripheral velocity of said cranks and means to adjust the height of said track.

9. In a cutting machine for multiple layer tissue and the like, comprising a frame having a base and back support, a conveyor belt mounted on said base and having a horizontal section arranged forward of said back support, means for moving said belt at a uniform speed, a track extending along said section, traverse means riding on said track having means to support and to effect a pair of bights in said belt spaced along the length thereof, a plurality of power driven cranks journaled in said back support, having a circular path of movement approximately double the spacing between said bights, a cutter bracket carried by said cranks and rotatable in a plane longitudinally and perpendicularly of said belt, a pair of circular cutters journaled in said bracket on an axis parallel with said section, and axially spaced to correspond to the space between said bights, said circular cutters having a diameter such as to intersect the path of said belt section, when swinging through a lowermost arc of their circular movement, means for moving said traverse means to and fro upon said track with said bights retained in the planes of said circular cutters, means carried by said bracket and movable therewith comprising a horizontally disposed pressure plate yieldingly supported upon said bracket and having slots through which the lower portion of said circular cutters may project, and yielding closure means for said slots adapted to embrace the opposite faces of said cutters, said pressure plate being adapted to approach said belt and resiliently clamp material traveling on said belt while said cutters traverse said arc, means carried by said bracket for grinding the edges of said cutters, means coordinating the movement of said belt with the peripheral velocity of said cranks, and means to adjust the height of said track.

10. In a cutting machine for multiple layer tissue and the like, comprising a frame having a base and back support, a conveyor belt mounted on said base and having a horizontal section arranged forward of said back support, means for moving said belt at a uniform speed, a track extending along said section, traverse means riding on said track having means to support and to effect a pair of bights in said belt spaced along the length thereof, a plurality of power driven cranks journaled in said back support, having a circular path of movement approximately double the spacing between said bights, a cutter bracket carried by said cranks and rotatable in a plane longitudinally and perpendicularly of said belt, a pair of circular cutters journaled in said bracket on an axis parallel with said section and spaced apart by a distance equal to one-half of the circumference of said crank circular path, and axially spaced to correspond to the space between said bights, said circular cutters having a diameter such as to intersect the path of said belt section, when swinging through a lowermost arc of their circular movement, means for moving said traverse means to and fro upon said track with said bights retained in the planes of said circular cutters, and means coordinated with the movement of said cutters for moving said belt twice the distance between said cutters for each revolution of said cranks.

11. In a cutting machine for multiple layer tissue and the like, comprising a frame having a base and back support, a conveyor belt mounted on said base and having a horizontal section arranged forward of said back support, means for moving said belt at a uniform speed, a track extending along said section, traverse means riding on said track having means to support and to effect a pair of bights in said belt spaced along the length thereof, a plurality of power driven cranks journaled in said back support, having a circular path of movement approximately double the spacing between said bights, a cutter bracket carried by said cranks and rotatable in a plane longitudinally and perpendicularly of said belt, a pair of circular cutters journaled in said bracket on an axis parallel with said section, and axially spaced to correspond to the space between said bights, said circular cutters having a diameter such as to intersect the path of said belt section, when swinging through a lowermost arc of their circular movement, means for moving said traverse means to and fro upon said track with said bights retained in the planes of said circular cutters, means coordinating the movement of said belt with the peripheral velocity of said cranks, and means located with each of said bights for directing a stream of air upwardly for air buoying the cut end of material across said bights.

OLIVER E. TEALL.

REFERENCES CITED

The following references are of record in the file of this patent:

UNITED STATES PATENTS

| Number | Name | Date |
|---|---|---|
| 1,742,295 | Young | Jan. 7, 1930 |
| 1,802,846 | Stohl | Apr. 28, 1931 |
| 1,919,899 | Meyer et al. | July 25, 1933 |
| 2,040,799 | Swift | May 12, 1936 |
| 2,207,938 | Newman et al. | July 16, 1940 |
| 2,320,652 | Preston | June 1, 1943 |
| 2,350,975 | Rodder et al. | June 6, 1944 |
| 2,369,947 | Curle et al. | Feb. 20, 1945 |